US006931624B1

(12) United States Patent
Snider

(10) Patent No.: US 6,931,624 B1
(45) Date of Patent: Aug. 16, 2005

(54) PROGRAMMING METHOD AND MODEL FOR EXPRESSING SYNCHRONOUS, FINE-GRAINED PARALLELISM

(75) Inventor: Gregory Stuart Snider, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 593 days.

(21) Appl. No.: 09/984,395

(22) Filed: Oct. 30, 2001

(51) Int. Cl.[7] .............................................. G06F 9/44
(52) U.S. Cl. ................. 717/108; 717/116; 717/107; 717/104; 715/514; 715/500.1
(58) Field of Search .................. 717/104, 108, 717/109, 116, 100, 101; 715/500.1, 514; 700/7, 103; 705/7; 709/203; 711/150

(56) References Cited

U.S. PATENT DOCUMENTS

| | | | | | |
|---|---|---|---|---|---|
| 5,652,714 | A | * | 7/1997 | Peterson et al. | 702/57 |
| 5,801,687 | A | * | 9/1998 | Peterson et al. | 715/500.1 |
| 5,907,704 | A | * | 5/1999 | Gudmundson et al. | 717/100 |
| 5,920,718 | A | * | 7/1999 | Uczekaj et al. | 717/109 |
| 6,038,590 | A | * | 3/2000 | Gish | 709/203 |
| 6,222,537 | B1 | * | 4/2001 | Smith et al. | 715/762 |
| 6,289,252 | B1 | * | 9/2001 | Wilson et al. | 700/7 |
| 6,397,355 | B1 | * | 5/2002 | Curtis et al. | 714/38 |
| 6,463,565 | B1 | * | 10/2002 | Kelly et al. | 716/1 |
| 6,477,439 | B1 | * | 11/2002 | Bernaden et al. | 700/103 |
| 6,505,342 | B1 | * | 1/2003 | Hartmann et al. | 717/104 |
| 6,665,648 | B2 | * | 12/2003 | Brodersen et al. | 705/7 |
| 6,691,299 | B1 | * | 2/2004 | Hart et al. | 717/108 |
| 6,754,786 | B2 | * | 6/2004 | Suzuki et al. | 711/150 |

OTHER PUBLICATIONS

TITLE: Object–Oriented State Machines: Subclassing, Composition, Delegation, and Genericity, author: Sane et al, ACM, 1995.*
B, Ramakrishna Rau, "Iterative Modulo Scheduling", Nov. 1995, pp. 1–67.
S. E. Mitchell and A.J. Wellings, "TAO: A Model For Concurrency in Object–Oriented Programming", Dec. 13, 1993, pp. 1–29.
Matt Bowen, Embedded Solutions Application Note 002, "Handel–C and the Alex APAC509", Feb. 6, 1998, pp. 1–4.
Peter Clarke and Richard Goering, EE Times, "C Level Fields C + + Class Library", Aug. 30, 2000, pp. 1–4.
Chris Edwards, Electronics Times, "Panel Weight Hardware, Software Design Options", Aug. 30, 2000, pp. 1–4.
Whitepaper: Forge–J. Lavalogic, "Forge–J", Aug. 30, 2000, pp. 1–8.

(Continued)

Primary Examiner—Chameli C. Das

(57) ABSTRACT

In a programming model, a machine is represented in an object-oriented language by extending a Machine base class representing a state machine, to form a first class representing a first state machine. Each class extending the base class, includes at least one variable reflecting a state of the machine it represents. Also included are a method for receiving zero or more input parameters and advancing a state of the machine; a method for returning data reflecting a state of the machine; and an optional method that connects an output of one state machine to an input of another state machine. The state machines can be nested (as the classes extending the base class can be nested). A parallel program can be a single instance of a class extending the base class. All machine instances execute concurrently, regardless of where they are declared.

18 Claims, 3 Drawing Sheets

OTHER PUBLICATIONS

Brass Research Group, "Automatic C Compilation to SW + Reconfigurable HW", Aug. 30, 2000, pp. 1–3.

Maya Gokhale and Brian Schott, "Data–Parallel C on Revonfigurable Logic Array", 1995, pp. 291–313.

Peter L. Flake, Simon J. Davidmann and David J. Kelf, Co–Design Automation, "Superlog Evolving Verilog and C For System–on–Chip Design", Mar. 8, 2000, pp. 1–7.

Don Davis, Lavalogic"Java For Digital Circuit Design", Aug. 30, 2000, pp. 1–5.

David Galloway, "The Transmogrifier C Hardware Description Language and Compiler For FPGAs", 1995, pp. 136–144.

Walter Lee, Rajeev Barua, Matthew Frank, Devabhaktuni Srikrishna, Jonathan Babb, Vivek Sarkar, and Saman Amarasinghe, "Space–Time Scheduling of Instruction–Level Parallelism on a Raw Machine", Oct. 1998, pp. 1–11.

Jonathan Babb, Matthew Frank, Victor Lee, Elliot Waingold, Rahee Barua, Michael Taylor, Jang Kim, Srikrishna Devabhaktuni, and Anant Agarwal, "The Raw Benchmark Suite: Computation Structure For General Purpose Computing", 1997, pp. 1–10.

Rajeev Barua, Walter Lee, Saman Amarasinghe, Anant Agarwal, "Maps: A Complier–Managed Memory System For Raw Machines", Jun. 1999, pp. 1–22.

Joao M.P. Cardoso and Horacio C. Neto, "Fast Hardware Compilation of Behaviors into an FPGA–Based Dynamic Reconfigurable Computing System", 1999, pp. 150–153.

Lars E. Thon, Ken Rimey and Lars Svensson, "From C To Silicon", Feb. 8, 2000, pp. 1–14.

Christian Iseli and Eduardo Sanchez, "A C + + Complier For FPGA Custom Execution Units Syntheses", 1995, pp. 173–179.

Xiaohan Zhu and Bill Lin, "Hardware Compilation for FPGA–based Configurable Computing Machines", 1999, pp. 1–6.

Niklaus Wirth, "Hardware Compilation: Translating Programs into Circuits", Jun. 1998, pp. 25–31.

Jonathan Babb, Martin Rinard, Csaba Andras Moritz, Walter Lee, Matthew Frank, Rajeev Barua, and Saman Amarasinghe, "Parallelizing Applications into Silicon", 1999, pp. 70–80.

Timothy J. Callahan and John Wawrzynek, "Instruction–Level Parallelism For Reconfigurable Computing", 1998, pp. 1–6.

D. Ku and G. DeMicheli, "HardwareC–A Language For Hardware Design (Version 2.0)", Technical Report SCSL/CSL/TR–90–419, Computer Systems Laboratory, Stanford University, Stanford, LA, Aug. 1990, pp. 1–50.

S. Vernalde, P. Schaumont and I. Bolsens, "An Object Oriented Programming Approach For Hardware Design", 1999, pp. 1–6.

Robert Schreiber, Shail Aditya, B. Ramakrishna Rau, Vinod Kathail, Scott Mahlke, Santosh Abraham, Greg Snider, and Sadun Anik, "High–Level Synthesis of Nonprogrammable Hardware Accelerators", May 2000, pp. 1–5.

* cited by examiner

PROGRAMMING METHOD AND MODEL FOR EXPRESSING SYNCHRONOUS, FINE-GRAINED PARALLELISM

BACKGROUND OF THE INVENTION

1. Field of the Invention

The present invention relates generally to techniques for defining or describing state machines, which can then be implemented in hardware or software.

2. Background Information

Configurable architectures can consume orders of magnitude less power than conventional processors for certain applications, and are increasingly found in computation-intensive applications that have limited energy supplies (e.g., that are battery-powered). For example, portable cell phones/Web browsers can benefit by incorporating configurable, low-power-consumption architectures that can support such computational racehorses as speech recognition, encryption, channel encoding, biometrics, graphics rendering, handwriting recognition, data compression, and so forth.

Many applications can benefit from massive parallelism. For example, computational chemistry, network switching, computer holography, and other computational "Grand Challenge" problems.

One known approach is to improve algorithms for extracting parallelism from "dusty deck" sequential code. This involves the transformation of conventional application code into a parallel form. Automatic parallelization is primarily limited to regular structures, such as nested loops, because irregular structures are much more difficult to handle. Nested loops are written in a constrained style, typically requiring that array references must affine functions of the loop indices. Such "dusty deck" sequential code can often (but not always) be written to meet the constraints, but it is then no longer "dusty deck" because it uses a new programming model.

Another known approach extends a conventional programming language with a parallel programming model. Prior systems taking this approach include Handel-C, HardwareC, RL, TransmogrifierC, Spyder C++, Data Parallel C, and Picasso. Since these languages are extensions of standard languages, they are only compilable onto their respective target hardware platforms. They cannot be compiled and debugged with a standard compiler on a personal computer.

A third known approach involves using a hardware design language, for example a language such as VHDL and Verilog. Other hardware design languages include C Level, System C, Spec C and Superlog. Hardware design languages are low-level languages and are difficult to integrate with other application code. Hardware languages cannot be compiled using standard compilers onto a personal computer for execution, but must instead be simulated.

SUMMARY OF THE INVENTION

A method or programming model for representing at least one machine (e.g., a state machine) in an object-oriented language, includes establishing a Machine base class representing a state machine, and extending the base class to form a first class representing a first state machine, and instantiating the first class. Each class extending the Machine base class, includes at least one variable reflecting a state of the state machine it represents. Also included are methods (which can be limited to at most three methods), including a) a first method for advancing a state of the state machine represented by the extended class; and b) a second method for returning data reflecting a current state of the state machine. A third method, implemented in the machine base class, connects an output of one state machine to an input of another state machine. The state machines can be nested (as classes extending the base class can be nested). A parallel program in this programming model can be a single instance of a class that extends the Machine base class. The single instance can have classes/machines nested within it. In accordance with an exemplary embodiment of the invention, all instances execute concurrently, regardless of where they are declared within the hierarchy.

In accordance with an exemplary embodiment of the invention, a method for representing at least one state machine in an object-oriented language includes establishing a base class representing a base state machine, and extending the base class to form a first class representing a first state machine. The first class includes at least one variable reflecting a state of the first state machine. The first class can include a first method for advancing both a state of the state machine represented by the first class and a state of any state machine represented within the at least one first class. The first class can also include a second method for returning data reflecting a current state of the state machine represented by the at least one first class, wherein the first method receives zero or more input parameters. At least one variable can be an instance of at least one second class that extends the base class and represents at least one second state machine. In accordance with an embodiment of the invention, each class within the first class can include at least one variable reflecting a state of the state machine represented by the each class, a first method for receiving zero or more input parameters and advancing a state of the state machine represented by the each class, and a second method for returning data reflecting a current state of the state machine represented by each class, wherein all instances of classes encompassed within the first class execute concurrently.

DESCRIPTION OF THE DRAWINGS

Other objects and advantages of the present invention will become apparent to those skilled in the art from the following detailed description of preferred embodiments, when read in conjunction with the accompanying drawings wherein like elements have been designated with like reference numerals and wherein.

DETAILED DESCRIPTION OF THE PREFERRED EMBODIMENTS

Figure 1:
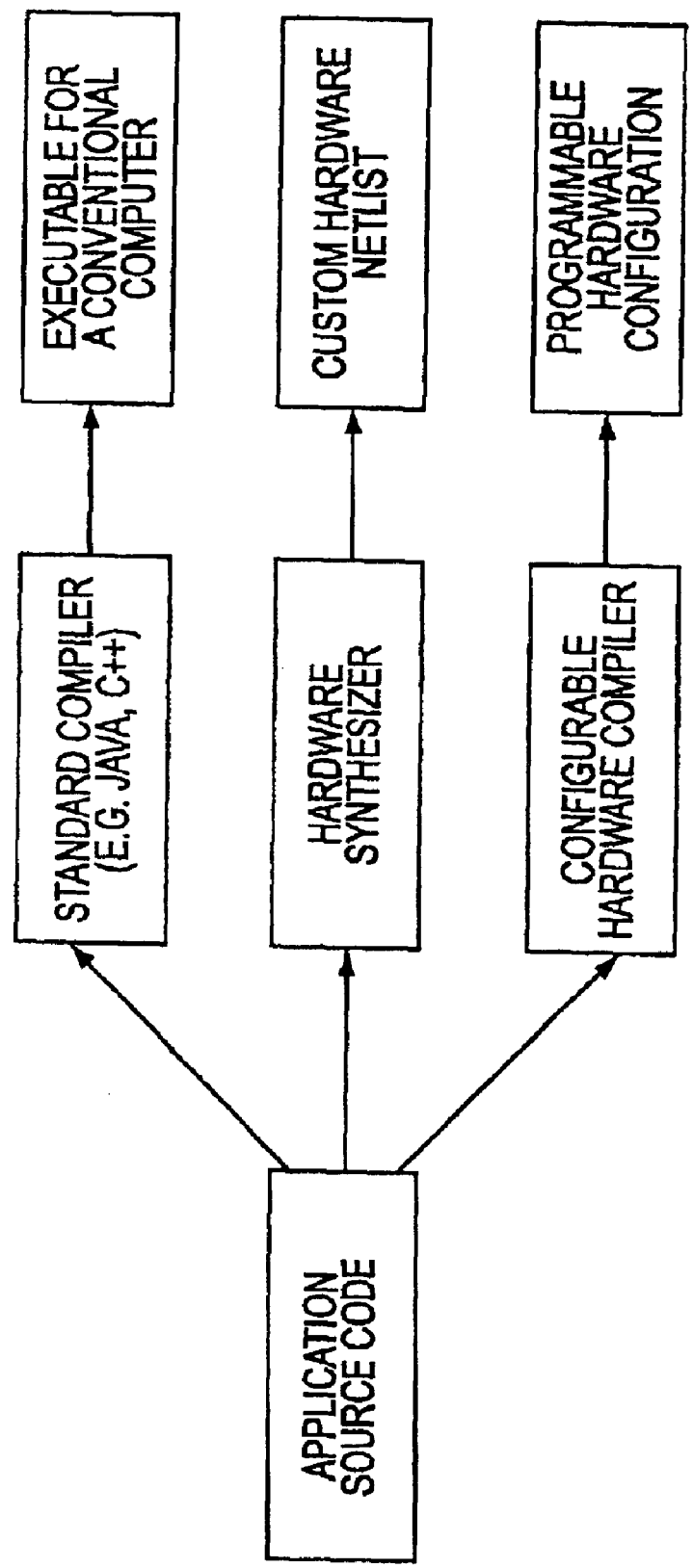
FIG. 1 illustrates in accordance with the invention, how the model can be compiled or used in different ways.

In accordance with the invention, a programming model and code are provided to allow a conventional object-oriented language to be used to design hardware. In other words, in accordance with the invention, a conventional object-oriented language can be used to define machines (e.g., state machines) in such a way that the machines can be easily implemented in target hardware, as shown for example in FIG. 1. Any appropriate object-oriented programming language can be used in accordance with the principles of the invention. As shown in FIG. 1, once a machine is constructed or defined using an object-oriented programming language, it can be compiled or used in different ways, for example a) compiled for execution on a conventional computer such as a desktop or laptop, b) processed by a hardware synthesizer to create a custom hardware definition or specification, or c) compiled by a configurable hardware compiler for configuring a programmable hardware such as an FPGA (Field Programmable Gate Array).

For example, the target hardware can be raw hardware, such as a custom VLSI (Very Large Scale Integration) design, and/or can be programmable hardware, such as an FPGA (Field Programmable Gate Array). Thus, using a standard object-oriented language, for example C++ or Sun Microsystems' JAVA programming language, an application written using the invention (e.g., a state machine defined in accordance with the invention) to be compiled using a standard compiler onto a conventional computer, and also onto specialized hardware as shown in FIG. 1.

Figure 2:
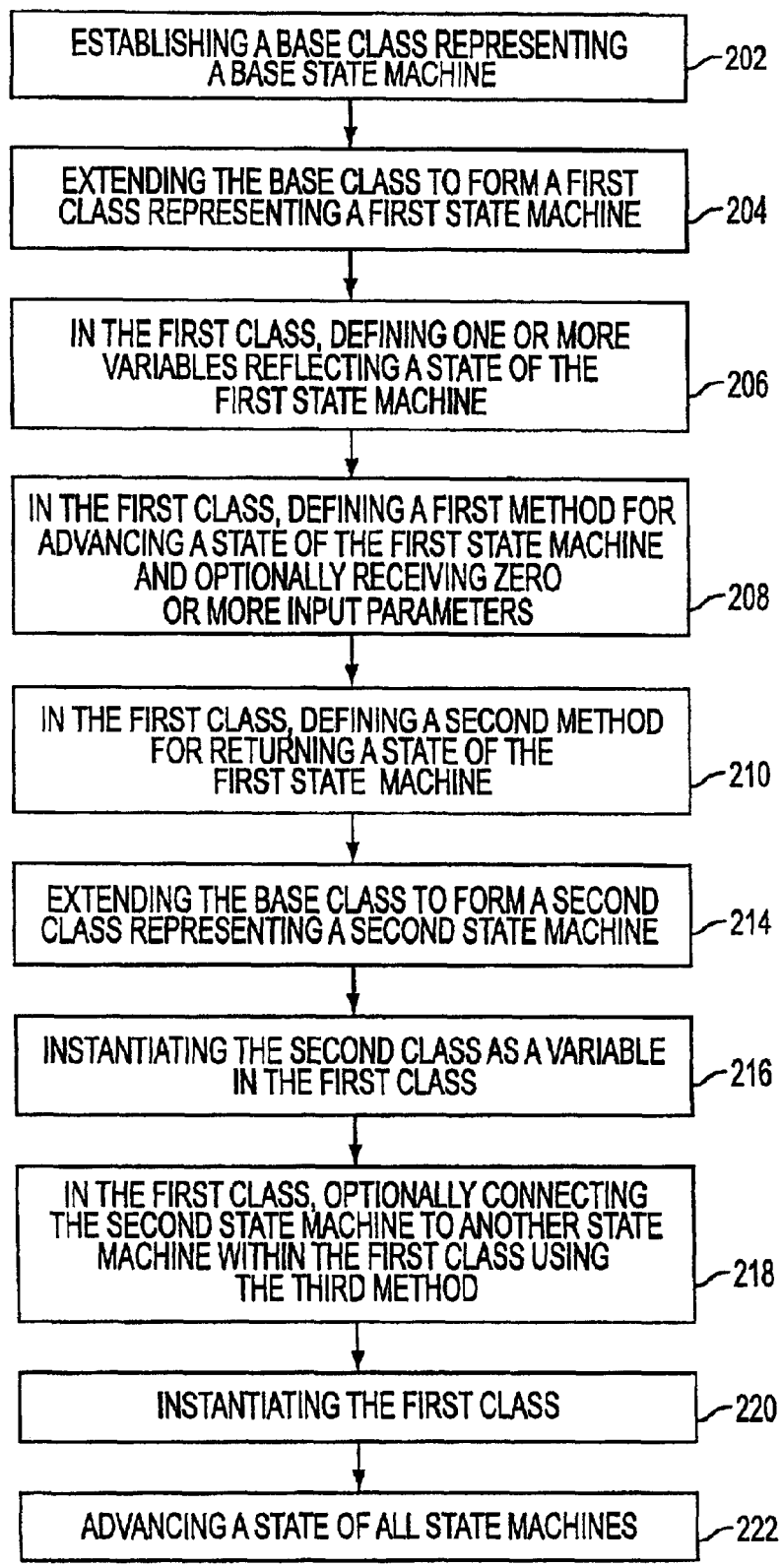
FIG. 2 shows a flow diagram in accordance with an embodiment of the invention.

FIG. 2 shows a flow diagram in accordance with an exemplary embodiment of the invention. In a first step 202, a base class is established, which represents a state machine. From step 202 control proceeds to step 204, where the base class is extended to form a first class representing a first state machine. From step 204 control proceeds to step 206, where one or more variables are defined in the first class, to reflect a state of the first state machine. From step 206 control proceeds to step 208, where in the first class, a first method is defined, for advancing a state of the first state machine and optionally receiving zero or more input parameters. From step 208 control proceeds to step 210, where a second method is defined in the first class, for returning a state of the first state machine. Where state machine instances of classes are defined within the first class, these state machines can be connected, and their ultimate output can reflect a state of the first machine, or can be combined with other state variables in the first class to represent a state of the first state machine.

From step 210 control proceeds to step 214, where the base class is extended to form a second class representing a second state machine. This can be a direct extension of the base class, with no intervening classes. Alternatively the second class can be an indirect extension of the base class, for example; class "C" extends the base class; class "D" extends class "C"; and the second class extends class "D".

From step 214, control proceeds to step 216, where the second class is instantiated as a variable in the first class. The second class can be instantiated multiple times as different variables in the first class, and other classes (for example, classes extending from the base class) can also be instantiated as variables in the first class. In this way, classes and corresponding state machines can be nested. From step 216, control proceeds to step 218, in which the second state machine is optionally connected to another state machine within the first class using the third method. For example, the second state machine can be connected to another instance of the second class within the first class, and/or to other state machines (other classes instantiated within the first class). Multiple state machines can be connected or strung together.

From step 218, control proceeds to step 220, where the first class is instantiated.

From step 220, control proceeds to step 222, where a state of the first state machine is advanced. In this case, the first state machine can be the highest-level or highest-hierarchy machine. This can be the machine that the user or programmer regards as the final product or the culmination of his or her efforts. The first state machine can have multiple state machines embedded and nested within it, as indicated for example by steps 210–218. In accordance with an exemplary embodiment of the invention, when the state of the first state machine is advanced, the states of state machines nested or embedded within the first state machine are also advanced, for example synchronously.

Figure 3:
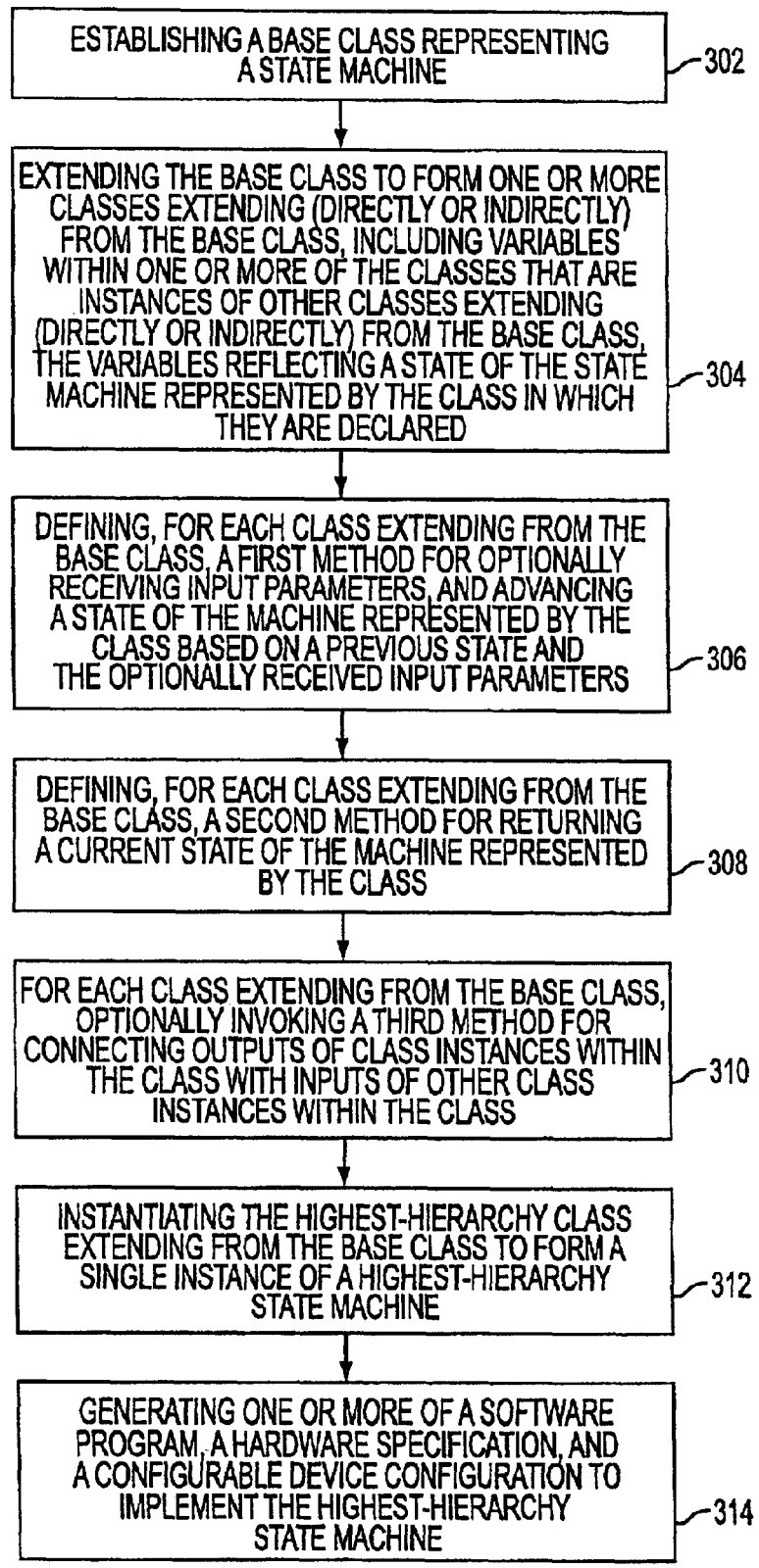
FIG. 3 shows another flow diagram in accordance with an embodiment of the invention.

FIG. 3 shows a conceptual overview of an embodiment of the invention. In a first step 302, a base class representing a state machine is established. The base class can be established by a) retrieving it from memory, b) referencing a definition of the base class embodied in an electronic medium, a printed medium, or any machine-readable or human-readable form, c) using the base class defined further below in pseudocode, or d) otherwise creating a base class that is consistent with the rules and requirements of the present invention, as variously described in the present disclosure. From step 302, control proceeds to step 304, where the base class is extended to form one or more classes extending (directly or indirectly) from the base class, including variables within one or more of the classes that are instances of other classes extending (directly or indirectly) from the base class. The variables reflect a state of the state machine represented by the class in which they are declared.

From step 304, control proceeds to step 306, where for each class extending from the base class, a first method is declared or defined for optionally receiving input parameters, and advancing a state of the machine represented by the class based on a previous state and the optionally received input parameters. From step 306, control proceeds to step 308, where for each class extending from the Base class, a second method is declared or defined for returning a current state of the machine represented by the class. From step 308 control proceeds to step 310, where for each class extending from the base class, a third method is optionally invoked for connecting outputs of class instances within the class with inputs of other class instances within the class. The third method can be provided in the base class. From step 310 control proceeds to step 312, which includes instantiating a highest-hierarchy class extending from the Base class to form a single instance of a highest-hierarchy state machine. From step 312, control proceeds to step 314, where one or more of a software program, a hardware specification, and a configurable device configuration are generated to implement the highest-hierarchy state machine.

The steps shown in FIGS. 2–3 can be implemented in any appropriate order, different from the orders shown in FIGS. 2–3. For example, the second class of FIG. 2 can be defined prior to the first class, and the various definitions can be adjusted or altered in any appropriate way and in any appropriate sequence to arrive at a first state machine that will function in accordance with the programmer's or user's intent.

In accordance with an exemplary embodiment of the invention, a user extends a base class called "Machine" to create new classes specific to the application the user is creating. A machine is an instance of the "Machine" class and is the smallest independent unit execution, analogous to a thread in a coarse-grained parallel system. The instance contains: 1) state information in the form of instance variables; 2) a method (called "step" here) which takes zero or more input parameters and updates the state information based on the input parameters and a previous state; 3) a method (called "getOutput" here) which returns state information; and 4) a method (called "connectInput" here) which allows the outputs of machines to be connected to inputs of other machines. The "connectInput" method is supplied by the base "Machine" class.

In accordance with an exemplary embodiment of the invention, the Machine base class is defined in the following pseudocode:

```
abstract class Machine {
    // The default behavior of all step methods is to do nothing.
    // Only one of these will be invoked for a machine; which one
    // depends on the number of inputs to the machine.
    // Additional step methods with more parameters may be declared.
    // The appropriate step method is called by pseudo-code
    // in numbered paragraph [0031] below.
    void step( ) { }
    void step(int in0) { }
    void step(int in0, int in1) { }
    void step(int in0, int in1, int in2) { }
    // Connect a machine (output) to the input of this machine.
    void connectInput(int input, Machine source) {
        associate "source" with "input" for this machine;
    }
    // Return the machine connected to a given input. This is used
    // by the pseudo-code in the middle of page 6 <-
    FIX THIS REFERENCE !!!
    Machine getInput(int input) {
        return the machine associated with "input";
    }
    // Computation of output implemented by subclass
    abstract int getOutput( );
}
```

By way of specific example, we can describe a pipeline, starting with an example of a digital low-pass filter, (written in Sun Microsystems' JAVA programming language):

```
class LowPassFilter extends Machine{
    int value = 0; // state variable
    void step(in( input) {
        value = value/2 + input/2;
    }
    int getOutput( ) {
        return value;
    }
}
```

A machine is the smallest independent unit of execution, analogous to a thread in a coarse-grained parallel system. Since LowPassFilter extends the Machine class, it too, is a Machine.

The value data member here, which is initialized to 0, holds or reflects the present state. The step( ) method is the core of the Machine: it causes the Machine to accept zero or more inputs, perform some computation, and update the state. The getOutput( ) method returns a function of the state. When instantiated, this will behave as though the following code were executed:

```
LowPassFilter filter = new LowPassFilter( );
int inputValue = 0;
while (true) {
    int result = filter.getOutput( );  // Get state (not used).
    filter.step(inputValue);           // Advance the filter state.
}
```

This, of course, is nothing more than a state machine that executes forever. Although implemented as a class that extends the Machine class, an instance of the LowPassFilter class is not strictly an object, although it is a data type. In accordance with an exemplary embodiment of the invention, a Machine subclass may declare only three methods: an optional constructor, a method called step( ) which takes zero or more arguments, and a method called getOutput( ), which returns data. Adding additional methods can be flagged as an error by the compiler.

Since a Machine is a data type, it can be declared as member data just like a primitive data type. This allows us to create interesting hierarchical structures, such as the following cascaded filter:

```
class CascadedFilter extends Machine {
    LowPassFilter[ ] cascade; // state variables
    CascadedFilter( ) {
        cascade = new LowPassFilter[10];
        for (int i = 0; i < 10; i++) {
            cascade[i] = new LowPassFilter( );
            if (i > 0)
                cascade[i].connectinput(cascade[i-1]);
        }
    }
    void step(int input) {
    }
    int getOutput( ) {
        return cascade[9].getOutput( );
    }
}
```

An instance of CascadedFilter creates a pipeline of concurrently executing LowPassFilters. Note the connectinput( ) method which allows machines to communicate with each other. An input that is unconnected will act as though it is reading a constant zero source, although the compiler will issue a warning about the unconnected input. Neither of these two examples do anything useful, since they both have unconnected inputs, but they illustrate the basis of the model.

In accordance with exemplary embodiments of the invention, one rule of the model is that a parallel program in this programming model consists of a single instance of a class that extends the Machine base class. Since machines may be nested, the total number of machines can be quite large. In accordance with exemplary embodiments of the a invention, another rule is that all Machine instances execute concurrently, regardless of where they are declared in the hierarchy, and behave as though the following pseudo-code were executed:

```
while (runnable) {
    collect outputs from all machines;
    distribute inputs to all machines;
    step( ) all machines;
}
```

The boolean variable "runnable" allows the machines to step for a predetermined number of steps, or until some condition has been met internally within the program. An instance cannot do much else, such as read data or call methods in other instances.

The present invention provides significant advantages. For example, it allows application programmers to express synchronous parallelism. This allows access to custom hardware, and also allows access to programmable hardware devices such as FPGAs.

The invention also provides the advantage of familiarity. A programmer familiar with a conventional object-oriented programming language can easily read and understand programs or machines defined in accordance with the invention, after becoming familiar with the programming model of the invention.

The invention also eases development of applications. This is because standard tools and development environments (such as Visual C++ or Visual Cafe), can be used to design, debug and execute the parallel application using a conventional sequential processor (such as a desktop computer).

The invention also speeds debugging. Since the source code can be compiled directly to machine code, it can be executed more quickly during development than hardware design languages, such as Verilog or VHDL, which must be simulated.

The invention also exploits the fine-grained, synchronous, high-bandwidth communication of FPGAs and other configurable architectures, as well as raw hardware, so that a resulting hardware implementation will be fast and provide ample amounts of computing power to support the solution.

The invention's use of software data types makes synchronous concurrency easy to express through a combination of data type instances and data type nesting. Pipelines, systolic arrays, cellular automata, "butterfly" computations (e.g. FFT(Fast Fourier Transforms)), and many other structures, including irregular computations, can be easily expressed in this model.

The invention also provides the desirable quality of abstraction, by hiding micro-architectural implementation issues from the programmer. Such issues include microsequencing, micro-pipelining and digit-serial function units.

In addition, the invention allows the construction and implementation of efficient compilers without heroic algorithmic efforts.

In summary, the invention brings the computational power of raw hardware to the application programmer, while sparing or freeing the application programmer from low-level details of the hardware. Thus, the invention painlessly provides performance comparable to an implementation written in a hardware design language.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A method for representing at least one state machine in an object-oriented language, comprising:
   establishing a base class representing a base state machine;
   extending the base class to form classes representing state machines, including the first class comprising at least one variable reflecting a state of the first state machine, wherein
   the at least one variable includes an instance of at least one second class that extends the base class and represents at least one second state machine; and
   instantiating a highest-hierarchy class extending from the base class to form a single instance of a highest-hierarchy state machine.

2. The method of claim 1, wherein the base class is of type data.

3. The method of claim 2, the first class comprising:
   a first method for synchronously advancing both a state of the state machine represented by the first class and a state of any state machine represented within the at least one first class.

4. The method of claim. 3, the first class comprising:
   a second method for returning data reflecting a current state of the state machine represented by the at least one first class;
   wherein the first method receives at least one input parameter.

5. The method of claim 4, the first class comprising:
   a third method for connecting an output of a state machine represented within the first class with an input of another state machine represented with the first class.

6. The method of claim 5, the first class comprising at most three methods.

7. The method of claim 5, wherein each class within the first class comprises:
   at least one variable reflecting a state of the state machine represented by the each class;
   a first method for receiving zero or more input parameters and advancing a state of the state machine represented by the each class; and
   a second method for returning data reflecting a current state of the state machine represented by the each class;
   wherein all instances of classes encompassed within the first class execute concurrently.

8. The method of claim 3, further comprising:
   instantiating the first class.

9. The method of claim 8, further comprising:
   advancing a state of the state machine represented by the first class based on the zero or more input parameters and a previous state of the state machine represented by the first class.

10. The method of claim 9, wherein for each state machine represented by or within the at least one first class, the advanced state of the state machine is based on input parameters and a previous state corresponding to the state machine.

11. The method of claim 9, wherein an unconnected input of any state machine represented by or within the at least one first class has a default input of zero.

12. The method of claim 1, the at least one second class comprising:
   at least one variable reflecting a state of the state machine represented by the at least one second class;
   a first method for advancing a state of the at least one second state machine and a state of any state machine represented within the at least one second class.

13. The method of claim 12, the at least one second class comprising:
   a second method for returning data reflecting a current state of the state machine represented by the at least one second class;
   wherein the first method of the at least one second class receives at least one input parameter.

14. The method of claim 13, the at least one second class comprising:
   a third method for connecting an output of a state machine represented within the first class with an input of another state machine represented with the first class.

15. The method of claim 13, wherein the at least one second class indirectly extends the base class.

16. A method for modeling a machine, comprising the steps of:

establishing a Base class representing a state machine;

extending the Base class to form classes extending from the Base class and representing state machines;

declaring variables within the classes, the variables reflecting a state of the state machine represented by the class in which they are declared, wherein some of the variables are instances of other classes extending from the Base class;

defining, for each class extending from the Base class, a first method for optionally receiving input parameters, and for advancing a state of the machine represented by the class based on a previous state and the optionally received input parameters;

defining, for each class extending from the Base class, a second method for returning a current state of the machine represented by the class;

for each class extending from the Base class, optionally invoking a third method for connecting outputs of class instances within the class, to inputs of other class instances within the class; and instantiating a highest-hierarchy one of the classes extending from the Base class to form a single instance of a highest-hierarchy state machine.

17. The method of claim 16, comprising:

generating at least one of a software program, a hardware specification, and a configurable device configuration based on the highest-hierarchy state machine; and realizing the highest-hierarchy state machine in at least one of a computer running the software program, a hardware device conforming to the hardware specification, and a configurable device configured using the configuration.

18. The method of claim 16, wherein some of the classes extend indirectly from the base class.

* * * * *